US012647886B2

(12) United States Patent

Hu et al.

(10) Patent No.: US 12,647,886 B2

(45) Date of Patent: Jun. 2, 2026

(54) SYSTEMS AND METHODS OF SUSPENSION AND RESUMPTION OF TARGET WAKE TIME (TWT) SCHEDULES

(71) Applicant: Meta Platforms Technologies, LLC, Menlo Park, CA (US)

(72) Inventors: Chunyu Hu, Saratoga, CA (US); Chittabrata Ghosh, Fremont, CA (US); Muhammad Kumail Haider, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 573 days.

(21) Appl. No.: 17/850,548

(22) Filed: Jun. 27, 2022

(65) Prior Publication Data

US 2023/0033678 A1 Feb. 2, 2023

Related U.S. Application Data

(60) Provisional application No. 63/225,991, filed on Jul. 27, 2021.

(51) Int. Cl.
*H04W 52/02* (2009.01)

(52) U.S. Cl.
CPC ................................ *H04W 52/0216* (2013.01)

(58) Field of Classification Search
CPC ..... H04W 52/00; H04W 52/02; H04W 52/04; Y02D 30/70
See application file for complete search history.

(56) References Cited

U.S. PATENT DOCUMENTS

| | | | | |
|---|---|---|---|---|
| 11,917,540 B2 * | 2/2024 | Kneckt | .............. | H04W 40/244 |
| 12,041,545 B2 * | 7/2024 | Ahn | .................. | H04W 52/0229 |

(Continued)

FOREIGN PATENT DOCUMENTS

TW 201739293 A 11/2017

OTHER PUBLICATIONS

"Draft Standard for Information Technology—Telecommunications and information Exchange between Systems Local and Metropolitan Area Networks—Specific Requirements ? ? Part 11: Wireless LAN Medium Access Control ? (MAC) and Physical Layer (PHY) Specifications ? ? Amendment 8: Enhancements for Extremely High Throughput (EHT)," 802 11 Working Group of The LAN/MAN Standards Committee of the IEEE Computer Society, vol. 802.11be drafts, No. D1.1, Jul. 23, 2021, 685 pages.

(Continued)

*Primary Examiner* — Liton Miah

(74) *Attorney, Agent, or Firm* — Foley & Lardner LLP

(57) ABSTRACT

A device may include one or more processors. The one or more processors may generate a first frame including a first target wake time (TWT) identifier subfield. The one or more processors may determine whether a particular broadcast TWT schedule is to be suspended. The one or more processors may set, in response to determining that the particular broadcast TWT schedule is to be suspended, the first TWT identifier subfield to a particular identifier value identifying the particular broadcast TWT schedule, such that a receiver device receiving the first frame with the first TWT identifier subfield is to suspend the particular TWT schedule. The one or more processors may wirelessly transmit, via a transmitter, the generated first frame to the receiver device.

18 Claims, 9 Drawing Sheets

(56) References Cited

U.S. PATENT DOCUMENTS

| | | | |
|---|---|---|---|
| 2015/0189592 A1* | 7/2015 | Jafarian ............ | H04W 52/0216 |
| | | | 370/311 |
| 2016/0219512 A1 | 7/2016 | Asterjadhi et al. | |
| 2016/0219522 A1* | 7/2016 | Asterjadhi ........ | H04W 52/0235 |
| 2019/0141361 A1 | 5/2019 | Deshpande | |
| 2019/0141631 A1 | 5/2019 | Patil et al. | |
| 2024/0129249 A1* | 4/2024 | Lu ......................... | H04W 28/02 |

OTHER PUBLICATIONS

International Search Report and Written Opinion for International Application No. PCT/US2022/074227, mailed Oct. 28, 2022, 11 pages.
Office Action mailed Dec. 2, 2025 for Taiwan Application No. 111127783, filed Jul. 25, 2022, 9 pages.

\* cited by examiner

470

| Value | Meaning | Time Priority |
|---|---|---|
| 0 | AID Switch Request | No |
| 1 | AID Switch Response | No |
| 2 | Sync Control | No |
| 3 | STA Information Announcement | No |
| 4 | EDCA Parameter Set | No |
| 5 | EL Operation | No |
| 6 | TWT Setup | No |
| 7 | TWT Teardown | No |
| 8 | Sectorized Group ID List | No |
| 9 | Sector ID Feedback | No |
| 10 | Reserved | |
| 11 | TWT Information | No |
| 12–255 | Reserved | |

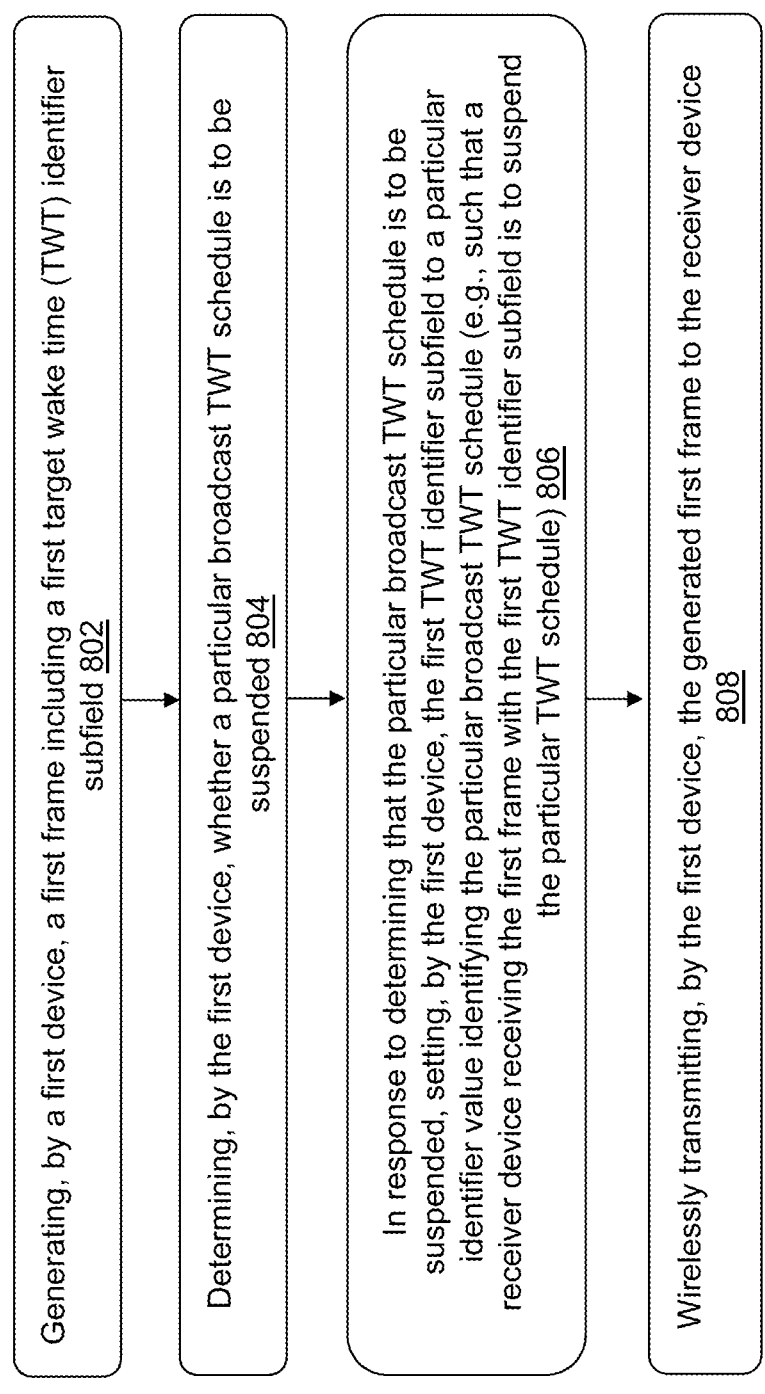

800

Generating, by a first device, a first frame including a first target wake time (TWT) identifier subfield 802

Determining, by the first device, whether a particular broadcast TWT schedule is to be suspended 804

In response to determining that the particular broadcast TWT schedule is to be suspended, setting, by the first device, the first TWT identifier subfield to a particular identifier value identifying the particular broadcast TWT schedule (e.g., such that a receiver device receiving the first frame with the first TWT identifier subfield is to suspend the particular TWT schedule) 806

Wirelessly transmitting, by the first device, the generated first frame to the receiver device 808

FIG. 8

SYSTEMS AND METHODS OF SUSPENSION AND RESUMPTION OF TARGET WAKE TIME (TWT) SCHEDULES

CROSS-REFERENCE TO RELATED APPLICATION

This application claims priority to U.S. Provisional Patent Application No. 63/225,991 filed on Jul. 27, 2021, which is incorporated by reference herein in its entirety for all purposes.

FIELD OF DISCLOSURE

The present disclosure is generally related to communications, including but not limited systems and methods of suspending and/or resuming TWT schedules.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space). An image of a virtual object may be generated by a console communicatively coupled to the HWD. In some embodiments, the console may have access to a network.

SUMMARY

Various embodiments disclosed herein are related to a device including one or more processors. The one or more processors may be configured to generate a first frame including a first target wake time (TWT) identifier subfield. The one or more processors may be configured to determine whether a particular broadcast TWT schedule is to be suspended. The one or more processors may be configured to set, in response to determining that the particular broadcast TWT schedule is to be suspended, the first TWT identifier subfield to a particular identifier value identifying the particular broadcast TWT schedule, such that a receiver device receiving the first frame with the first TWT identifier subfield is to suspend the particular TWT schedule. The one or more processors may be configured to wirelessly transmit, via a transmitter, the generated first frame to the receiver device.

In some embodiments, the first frame may include a first subfield. The one or more processors may be configured to set, in response to determining that the particular broadcast TWT schedule is to be suspended, the first subfield to a first value such that the receiver device receiving the first frame including the first TWT identifier subfield set with the particular identifier value and the first subfield set with the first value, is to suspend the particular TWT schedule.

In some embodiments, the first frame may include a second subfield. The one or more processors may be configured to set the second subfield to a second value indicating a type of frame that may be sent during a broadcast TWT schedule, e.g., such that the receiver device receiving the first frame including the second subfield set with the second value is to suspend a broadcast TWT schedule having a type of frame matching with the second value. The first frame may include a third subfield. The one or more processors may be configured to set the third subfield to a third value such that the receiver device receiving the first frame including the second subfield set with the second value and the third subfield set with the third value, is to suspend a broadcast TWT schedule having a type of frame matching with the second value.

In some embodiments, the first frame may include a fourth subfield. The one or more processors may be configured to set the fourth subfield to a fourth value indicating a type of TWT identifiers. When the fourth value indicates a first type of TWT identifiers, the one or more processors may be configured to set the TWT identifier using all bits of the first TWT identifier subfield. When the fourth value indicates a second type of TWT identifiers, the one or more processors may be configured to set the TWT identifier using less than all bits of the first TWT identifier subfield.

In some embodiments, the first frame may include a frame type field set with a type value indicating a first type of broadcast TWT schedules. The one or more processors may be configured to set, when the particular broadcast TWT schedule is of the first type of broadcast TWT schedules, the first TWT identifier subfield to the particular identifier value identifying the particular broadcast TWT schedule. The first type of broadcast TWT schedules is a restricted TWT type, in some embodiments. The first frame may include a fifth subfield. The one or more processors may be configured to set the fifth subfield to a fifth value such that the receiver device receiving the first frame including the fifth subfield set with the fifth value is to suspend any broadcast TWT schedule that has the first type of broadcast TWT schedules.

In some embodiments, the first frame may include a sixth subfield. The one or more processors are configured to set the sixth subfield to a particular time, e.g., such that the receiver device receiving the first frame including the sixth subfield set with the particular time is to resume the particular TWT schedule at the particular time, in one or more embodiments. The one or more processors may be configured to set the sixth subfield to a sixth value such that the receiver device receiving the first frame including the sixth subfield set with the sixth value is to resume the particular TWT schedule when the receiver device receives the first frame again at a later time.

Various embodiments disclosed herein are related to a method including generating, by a first device, a first frame including a first target wake time (TWT) identifier subfield. The method may include determining, by the first device, whether a particular broadcast TWT schedule is to be suspended. The method may include in response to determining that the particular broadcast TWT schedule is to be suspended, setting, by the first device, the first TWT identifier subfield to a particular identifier value identifying the particular broadcast TWT schedule, such that a receiver device receiving the first frame with the first TWT identifier subfield is to suspend the particular TWT schedule. The method may include wirelessly transmitting, by the first device, the generated first frame to the receiver device.

In some embodiments, the first frame may include a first subfield. In response to determining that the particular broadcast TWT schedule is to be suspended, the first device may set the first subfield to a first value, e.g., such that the receiver device receiving the first frame including the first TWT identifier subfield set with the particular identifier value and the first subfield set with the first value, is to suspend the particular TWT schedule.

In some embodiments, the first frame includes a second subfield. The first device may set the second subfield to a second value indicating a type of frame that may be sent during a broadcast TWT schedule, e.g., such that the receiver device receiving the first frame including the second subfield set with the second value, is to suspend a broadcast TWT schedule having a type of frame matching with the second value for instance. The first frame may include a third subfield. The first device may set the third subfield to a third value such that the receiver device receiving the first frame including the second subfield set with the second value and the third subfield set with the third value, is to suspend a broadcast TWT schedule having a type of frame matching with the second value for instance.

In some embodiments, the first frame may include a fourth subfield. The first device may set the fourth subfield to a fourth value indicating a type of TWT identifiers. When the fourth value indicates a first type of TWT identifiers, the first device may set the TWT identifier using all bits of the first TWT identifier subfield. When the fourth value indicates a second type of TWT identifiers, the first device may set the TWT identifier using less than all bits of the first TWT identifier subfield.

In some embodiments, the first frame may include a frame type field set with a type value indicating a first type of broadcast TWT schedules. When the particular broadcast TWT schedule is of the first type of broadcast TWT schedules, the first device may set the first TWT identifier subfield to the particular identifier value identifying the particular broadcast TWT schedule. The first type of broadcast TWT schedules may be a restricted TWT type. The first frame may include a fifth subfield. The first device may set the fifth subfield to a fifth value such that the receiver device receiving the first frame including the fifth subfield set with the fifth value is to suspend any broadcast TWT schedule that has the first type of broadcast TWT schedules for instance.

In some embodiments, the first frame may include a sixth subfield. The first device may set the sixth subfield to a particular time such that the receiver device receiving the first frame including the sixth subfield set with the particular time is to resume the particular TWT schedule at the particular time, for example. The first device may set the sixth subfield to a sixth value such that the receiver device receiving the first frame including the sixth subfield set with the sixth value is to resume the particular TWT schedule when the receiver device receives the first frame again at a later time.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIG. 4A and FIG. 4B illustrate an example TWT information frame format, according to an example implementation of the present disclosure.

FIG. 8 is a flowchart showing a process of suspending and/or resuming TWT schedules, according to an example implementation of the present disclosure.

DETAILED DESCRIPTION

Figure 1:
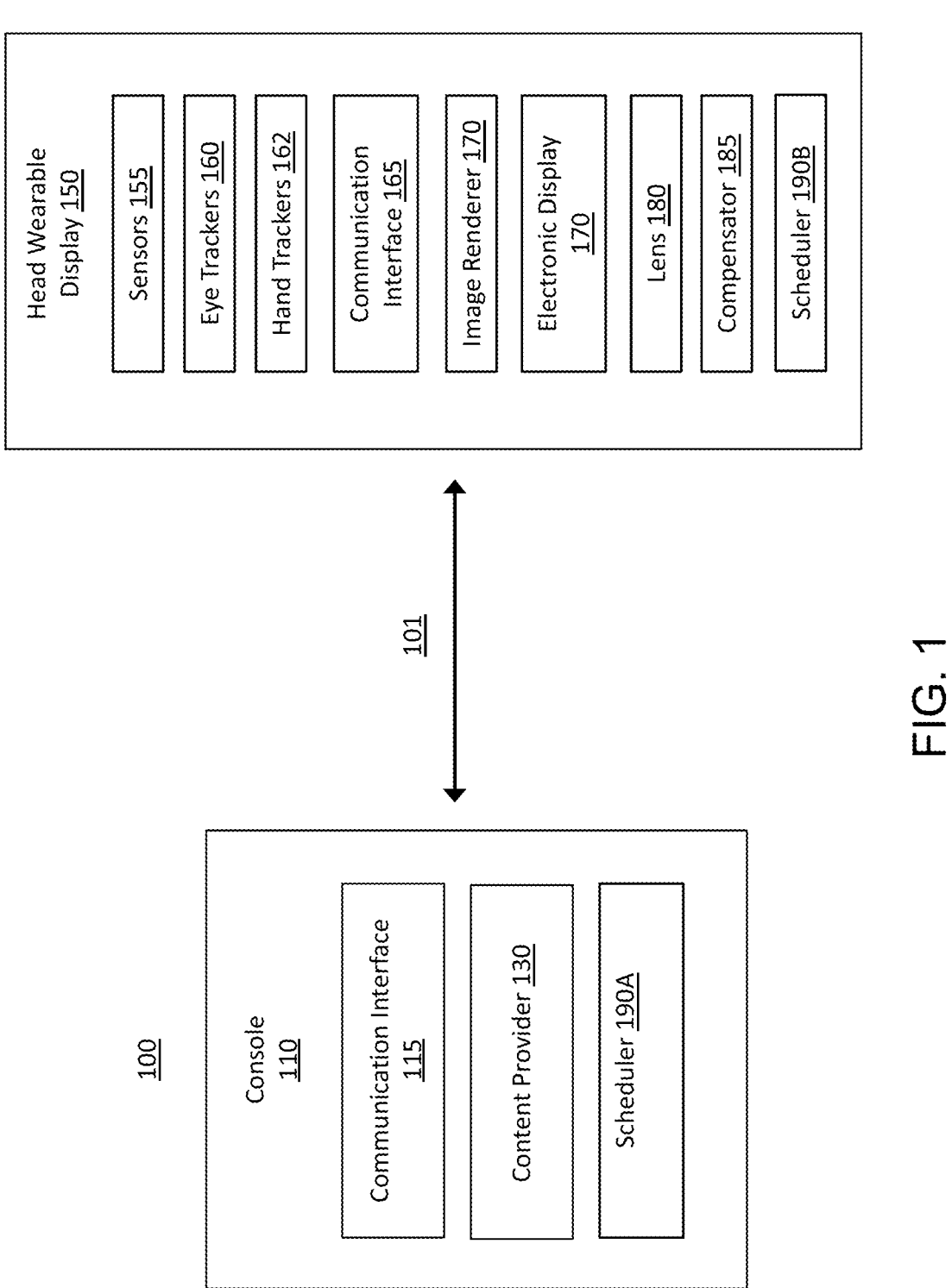
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are systems and methods related to suspending and/or resuming target wake time (TWT) schedules. In some embodiments, a device may include one or more processors. One example configuration is termed as a multi-link device (MLD), where multiple STAs are affiliated to a non-AP MLD. The one or more processors may be configured to generate a first frame including a first TWT identifier subfield. The one or more processors may be configured to determine whether a particular broadcast TWT schedule is to be suspended. The one or more processors may be configured to set, in response to determining that the particular broadcast TWT schedule is to be suspended, the first TWT identifier subfield to a particular identifier value identifying the particular broadcast TWT schedule, such that a receiver device receiving the first frame with the first TWT identifier subfield is to suspend the particular TWT schedule. The one or more processors may be configured to wirelessly transmit, via a transmitter, the generated first frame to the receiver device.

Streams of traffic may be characterized by different types of traffic (e.g., traffic types of video (VI), voice (VO), best effort (BE), background (BK). For instance, an application may be characterized by latency sensitive traffic or regular traffic. Latency sensitive traffic may be identifiable, in part, based on its periodicity or periodic nature (e.g., periodic bursts of traffic) and/or low latency requirement, in some embodiments. For instance, video display traffic may be driven by a refresh rate of 60 Hz, 72 Hz, 90 Hz, or 120 Hz. An application and/or device may have combinations of traffic types (e.g., latency sensitive traffic and non-latency sensitive traffic). Further, each stream of traffic for the application and/or device may be more or less spontaneous and/or periodic as compared to other streams of traffic for the application and/or device. Accordingly, traffic may vary according to applications and/or channel rate dynamics.

In some implementations, devices may provide different quality of services (QoS) using different links, frames, time slots, and the like. For example, a device (such as an AP) may prioritize some slots, frames, or packets over other slots, frames, or packets. In some applications, latency sensitive traffic that is not prioritized (e.g., to be processed or handled in a defined manner) may degrade a user experience. For example, in an AR context, latency between a movement of a user wearing an AR device and an image corresponding to the user movement and displayed to the user using the AR device may cause judder, resulting in motion sickness.

Under the target wake time (TWT) mechanism, STAs can wake up on a periodic basis to transmit/receive data. In an individual TWT (I-TWT) mode, TWT schedules may be chosen by client STAs while an AP can determine and/or provide schedules to all client STAs in a broadcast TWT (B-TWT) mode. The TWT mechanism also can be used for prioritizing latency sensitive traffic. For example, an extension of TWT called Restricted TWT (R-TWT) can force all other devices to finish their transmissions before the TWT service period (SP) begins, thereby allowing a particular STA or its traffic (e.g., latency sensitive traffic) to be prioritized over other STAs or their traffic. To better support latency sensitive traffic, it is beneficial to have a mechanism to control R-TWT schedules separately and independently from I-TWT schedules or B-TWT schedules.

FIG. 1 is a block diagram of an example artificial reality system environment 100 in which a console 110 operates. FIG. 1 provides an example environment in which devices may communicate traffic streams with different latency sensitivities/requirements. In some embodiments, the artificial reality system environment 100 includes a HWD 150 worn by a user, and a console 110 providing content of artificial reality to the HWD 150. A head wearable display (HWD) may be referred to as, include, or be part of a head mounted display (HMD), head mounted device (HMD), head wearable device (HWD), head worn display (HWD) or head worn device (HWD). In one aspect, the HWD 150 may include various sensors to detect a location, an orientation, and/or a gaze direction of the user wearing the HWD 150, and provide the detected location, orientation and/or gaze direction to the console 110 through a wired or wireless connection. The HWD 150 may also identify objects (e.g., body, hand face).

The console 110 may determine a view within the space of the artificial reality corresponding to the detected location, orientation and/or the gaze direction, and generate an image depicting the determined view. The console 110 may also receive one or more user inputs and modify the image according to the user inputs. The console 110 may provide the image to the HWD 150 for rendering. The image of the space of the artificial reality corresponding to the user's view can be presented to the user. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150, and/or some of the functionality of the HWD 150 may be performed by the console 110.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a communication interface 165, an image renderer 170, an electronic display 175, a lens 180, and a compensator 185. These components may operate together to detect a location of the HWD 150 and/or a gaze direction of the user wearing the HWD 150, and render an image of a view within the artificial reality corresponding to the detected location of the HWD 150 and/or the gaze direction of the user. In other embodiments, the HWD 150 includes more, fewer, or different components than shown in FIG. 1.

In some embodiments, the sensors 155 include electronic components or a combination of electronic components and software components that detect a location and/or an orientation of the HWD 150. Examples of sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and/or the rotational movement, and determine an orientation and location of the HWD 150. In one aspect, the sensors 155 can detect the translational movement and/or the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the HWD 150, the console 110 or a combination may incorporate the gaze direction of the user of the HWD 150 to generate image data for artificial reality. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gaze direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the hand tracker 162 includes an electronic component or a combination of an electronic component and a software component that tracks a hand of the user. In some embodiments, the hand tracker 162 includes or is coupled to an imaging sensor (e.g., camera) and an image processor that can detect a shape, a location and/or an orientation of the hand. The hand tracker 162 may generate hand tracking measurements indicating the detected shape, location and/or orientation of the hand.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link, a wired link, or both. Examples of the wireless link can include a cellular communication link, a near field communication link, Wi-Fi, Bluetooth, or any communication wireless communication link. Examples of the wired link can include a USB, Ethernet, Firewire, HDMI, or any wired communication link. In embodiments in which the console 110 and the head wearable display 150 are implemented on a single system, the communication interface 165 may communicate with the console 110 through a bus connection or a conductive trace. Through the communication link, the communication interface 165 may transmit to the console 110 sensor measurements indicating the determined location of the HWD 150, orientation of the HWD 150, the determined gaze direction of the user, and/or hand tracking measurements. Moreover, through the communication link, the communication interface 165 may receive from the console 110 sensor measurements indicating or corresponding to an image to be rendered.

Using the communication interface, the console 110 (or HWD 150) may coordinate operations on link 101 to reduce collisions or interferences. For example, the console 110 may coordinate communication between the console 110 and the HWD 150. In some implementations, the console 110 may transmit a beacon frame periodically to announce/advertise a presence of a wireless link between the console 110 and the HWD 150 (or between two HWDs). In an implementation, the HWD 150 may monitor for or receive the beacon frame from the console 110, and can schedule communication with the HWD 150 (e.g., using the information in the beacon frame, such as an offset value) to avoid collision or interference with communication between the console 110 and/or HWD 150 and other devices.

The console 110 and HWD 150 may communicate using link 101 (e.g., intralink). Data (e.g., a traffic stream) may flow in a direction on link 101. For example, the console 110 may communicate using a downlink (DL) communication to the HWD 150 and the HWD 150 may communicate using an uplink (UL) communication to the console 110.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, data describing an image to be rendered, and render the image through the electronic display 175. In some embodiments, the data from the console 110 may be encoded, and the image renderer 170 may decode the data to generate and render the image. In one aspect, the image renderer 170 receives the encoded image from the console 110, and decodes the encoded image, such that a communication bandwidth between the console 110 and the HWD 150 can be reduced.

In some embodiments, the image renderer 170 receives, from the console, 110 additional data including object information indicating virtual objects in the artificial reality space and depth information indicating depth (or distances from the HWD 150) of the virtual objects. Accordingly, the image renderer 170 may receive from the console 110 object information and/or depth information. The image renderer 170 may also receive updated sensor measurements from the sensors 155. The process of detecting, by the HWD 150, the location and the orientation of the HWD 150 and/or the gaze direction of the user wearing the HWD 150, and generating and transmitting, by the console 110, a high resolution image (e.g., 1920 by 1080 pixels, or 2048 by 1152 pixels) corresponding to the detected location and the gaze direction to the HWD 150 may be computationally exhaustive and may not be performed within a frame time (e.g., less than 11 ms or 8 ms).

In some implementations, the image renderer 170 may perform shading, reprojection, and/or blending to update the image of the artificial reality to correspond to the updated location and/or orientation of the HWD 150. Assuming that a user rotated their head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality.

In other implementations, the image renderer 170 generates one or more images through a shading process and a reprojection process when an image from the console 110 is not received within the frame time. For example, the shading process and the reprojection process may be performed adaptively, according to a change in view of the space of the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the pre-distorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a field of view (FOV) of the user) of the artificial reality corresponding to the location of the HWD 150 and/or the gaze direction of the user of the HWD 150, and can generate an image of the artificial reality corresponding to the determined view. In other embodiments, the console 110 includes more, fewer, or different components than shown in FIG. 1. In some embodiments, the console 110 is integrated as part of the HWD 150. In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., USB cable, a wireless link). Through the communication link, the communication interface 115 may receive from the HWD 150 sensor measurements indicating the determined location and/or orientation of the HWD 150, the determined gaze direction of the user, and/or hand tracking measurements. Moreover, through the communication link, the communication interface 115 may transmit to the HWD 150 data describing an image to be rendered.

The content provider 130 can include or correspond to a component that generates content to be rendered according to the location and/or orientation of the HWD 150, the gaze direction of the user and/or hand tracking measurements. In one aspect, the content provider 130 determines a view of the artificial reality according to the location and orientation of the HWD 150 and/or the gaze direction of the user of the HWD 150. For example, the content provider 130 maps the location of the HWD 150 in a physical space to a location within an artificial reality space, and determines a view of the artificial reality space along a direction corresponding to an orientation of the HWD 150 and/or the gaze direction of the user from the mapped location in the artificial reality space.

The content provider 130 may generate image data describing an image of the determined view of the artificial reality space, and transmit the image data to the HWD 150 through the communication interface 115. The content provider may also generate a hand model (or other virtual object) corresponding to a hand of the user according to the hand tracking measurement, and generate hand model data indicating a shape, a location, and an orientation of the hand model in the artificial reality space.

In some embodiments, the content provider 130 generates metadata including motion vector information, depth information, edge information, object information, etc., associated with the image, and transmits the metadata with the image data to the HWD 150 through the communication interface 115. The content provider 130 may encode and/or encode the data describing the image, and can transmit the encoded and/or encoded data to the HWD 150. In some embodiments, the content provider 130 generates and provides the image to the HWD 150 periodically (e.g., every one second).

Figure 2:
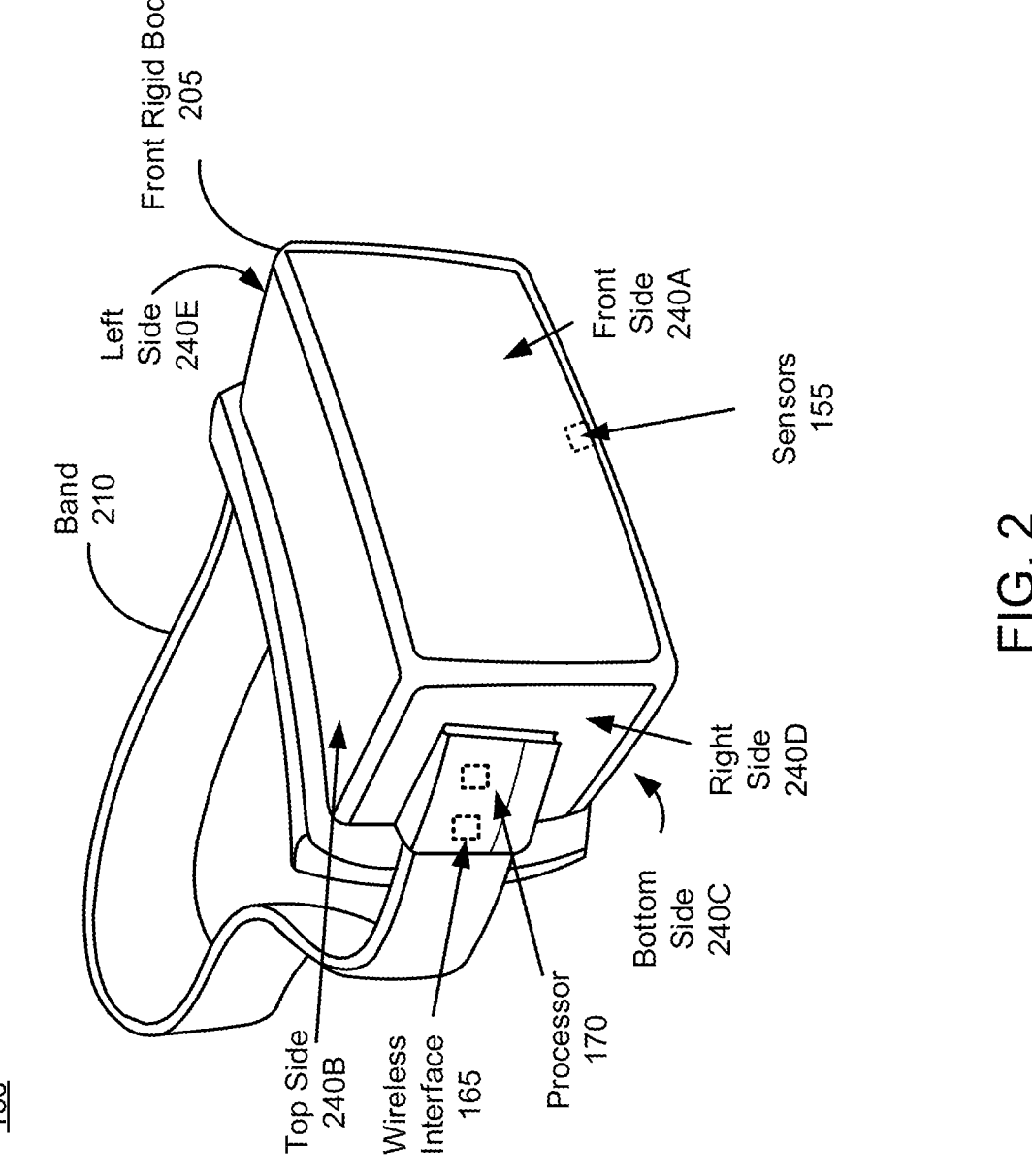
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the embodiment shown by FIG. 2, the sensors 155 are located within the front rigid body 205, and may not visible to the user. In other embodiments, the HWD 150 has a different configuration than shown in FIG. 2. For example, the image renderer 170, the eye trackers 160A, 160B, and/or the sensors 155 may be in different locations than shown in FIG. 2.

Figure 3:
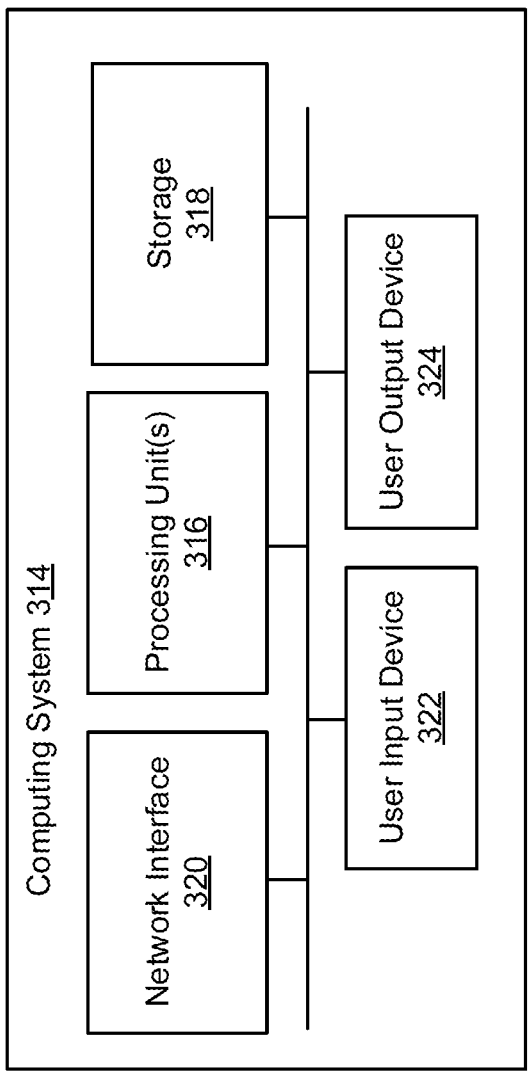
FIG. 3 is a block diagram of a computing environment according to an example implementation of the present disclosure.

Various operations described herein can be implemented on computer systems. FIG. 3 shows a block diagram of a representative computing system 314 usable to implement the present disclosure. In some embodiments, the console 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

The network interface 320 may include a transceiver to allow the computing system 314 to transmit and receive data from a remote device (e.g., an AP, a STA) using a transmitter and receiver. The transceiver may be configured to support transmission/reception supporting industry standards that enables bi-directional communication. An antenna may be attached to transceiver housing and electrically coupled to the transceiver. Additionally or alternatively, a multi-antenna array may be electrically coupled to the transceiver such that a plurality of beams pointing in distinct directions may facilitate in transmitting and/or receiving data.

A transmitter may be configured to wirelessly transmit frames, slots, or symbols generated by the processor unit 316. Similarly, a receiver may be configured to receive frames, slots or symbols and the processor unit 316 may be configured to process the frames. For example, the processor unit 316 can be configured to determine a type of frame and to process the frame and/or fields of the frame accordingly.

User input device 322 can include any device (or devices) via which a user can provide signals to computing system 314; computing system 314 can interpret the signals as indicative of particular user requests or information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Under the target wake time (TWT) mechanism, STAs can wake up on a periodic basis to transmit/receive data. In an individual TWT (I-TWT) mode, TWT schedules may be chosen by client STAs while an AP can determine and can provide schedules to all client STAs in a broadcast TWT (B-TWT) mode. The TWT mechanism can be used for prioritizing latency sensitive traffic. For example, an extension of TWT called Restricted TWT (R-TWT) can force/configure all other devices to finish their transmissions before the TWT service period (SP) begins, thereby allowing a particular STA or its traffic (e.g., latency sensitive traffic) to be prioritized over other STAs or their traffic.

An AP may enhance medium access protection and resource reservation by supporting R-TWT (as a specific type of B-TWT) with respect to particular traffic streams. The R-TWT SPs may deliver latency sensitive traffic and/or any additional frame that supports latency sensitive traffic. In some implementations, TWT information frames may be used to suspend TWT schedules indefinitely or until some specified later time. TWT Information frames may also be used to resume TWT schedules indefinitely or for a certain time duration.

Figure 4A:
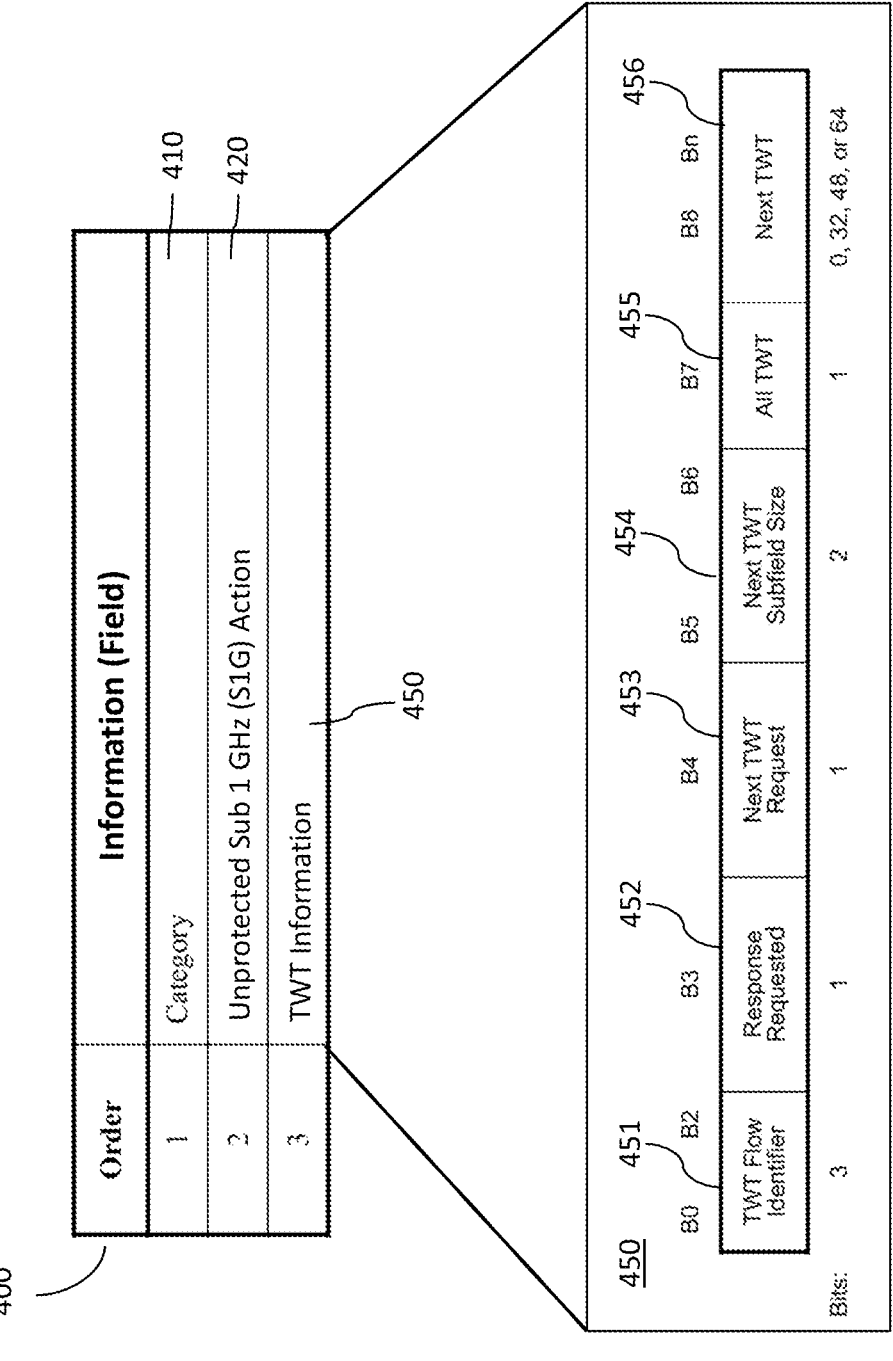

FIG. 4A and FIG. 4B illustrate example TWT information frame format(s), according to at least one example implementation of the present disclosure. A TWT information frame 400 may include (in a TWT information frame action field format, for example) a category field 410, an unprotected sub 1 GHz (S1G) action field 420, and a TWT information field 450. The unprotected S1G action field 420 in the TWT information frame action field format may identify a frame type as a TWT information frame. For example, the unprotected S1G action field 420 of a TWT information frame may have the value of 11 which corresponds to the item "TWT Information" 475 in a table 470 which lists possible unprotected S1G action field values (see FIG. 4B).

The suspension and/or resumption information may be specified in the TWT information field 450 carried by the TWT information frame 400. The TWT information field 450 may be used for both individual TWT (I-TWT) schedules and broadcast TWT (B-TWT) schedules. The TWT information field 450 may include subfields of TWT flow identifier (or TWT ID) 451, response requested 452, next TWT request 453, next TWT subfield size 454, all TWT 455, and/or next TWT 456. The TWT ID subfield 451 may identify an I-TWT schedule. The next TWT subfield size subfield 454 may define the size of the next TWT subfield (in bits) which may have a variable size. For example, the next TWT subfield may have the size of 0, 32, 48, or 64 bits. The all TWT subfield 455 may indicate, if set, that suspension and/or resumption may apply to all I-TWT schedules and B-TWT schedules (including R-TWT schedules). For example, if an AP broadcasts a TWT information frame with the all TWT subfield set to "1", devices (STAs) receiving the TWT information frame may suspend and/or resume all I-TWT schedules and B-TWT schedules (including R-TWT schedules).

The next TWT subfield 456 may specify, if present (e.g., set to "1"), when the schedule(s) is/are to resume. If absent (e.g., set to "1"), the next TWT subfield may indicate that schedule(s) may be suspended indefinitely so that the schedules can be resumed and/or suspended by explicitly providing indication(s) for resuming and/or suspending them (by sending TWT information frames). In this manner, the next TWT subfield may identify a time (like a time synchronization function value) that the TWT schedules (including both I-TWT and B-TWT) may be resumed and/or suspended. When a device, such as an AP, receives the TWT information field format (e.g., TWT information field 450) from another device such as a STA, then all TWT schedules may be suspended until the value specified in the next TWT subfield for example, and all the TWT schedules may be resumed at the time of the value specified in the next TWT subfield for instance.

In some implementations, an AP is to suspend and/or resume a specific R-TWT schedule (or a specific R-TWT schedule). For example, a R-TWT schedule may be used to communicate latency sensitive traffic for an application or device, and an AP may suspend and/or resume that R-TWT schedule depending on the status of the overall traffic. However, in some implementations, a device (e.g., AP or STA) may suspend particular B-TWT schedules if a TWT information frame (in which the unprotected S1G action field 420 is set to the value corresponding to "TWT information" as shown in FIG. 4A and FIG. 4B) is communicated within a service period (SP) of the TWT. That is, the device may wait until the SP of a B-TWT schedule in order to suspend and/or resume the B-TWT. As R-TWT may be used for communicating latency sensitive traffic, waiting for the SP of the B-TWT schedule may be disadvantageous.

Moreover, because R-TWT is a type of B-TWT, an R-TWT operation may use B-TWT operation as the basis for signaling such that R-TWT inherits the format of TWT information frame for the functionality of suspension and/or resumption for instance. For example, the size of B-TWT identifier (for identifying a B-TWT schedule) and the size of R-TWT (for identifying a R-TWT schedule) may have the size of 5 bits. However, in some implementations, the TWT flow identifier subfield (e.g., TWT flow identifier 451) may have the size of 3 bits to identify I-TWT schedules, and accordingly may not be used to identify a particular B-TWT schedule (or a particular R-TWT schedule). Therefore, it may be beneficial to have a mechanism for TWT suspension and/or resumption, without waiting until an SP of a B-TWT schedule by identifying specific B-TWT (and R-TWT).

Furthermore, in some implementations, the all TWT subfield (e.g., All TWT 455 in FIG. 4A) in the TWT information field (e.g., TWT information field 450 in FIG. 4A) applies to all B-TWT and I-TWT schedules so as to suspend and/or resume all the B-TWT and I-TWT schedules without a distinction between R-TWT schedules and B-TWT schedules. Distinguishing between R-TWT and B-TWT is advantageous since R-TWT may be used for communicating latency sensitive traffic, and B-TWT may be used as a power saving mechanism. For example, a device may want to suspend B-TWT schedules but not want to suspend R-TWT schedules. Accordingly, it may be beneficial to have a mechanism to distinguish between B-TWT and R-TWT. For example, there it may be beneficial to have a mechanism to suspend and/or resume all B-TWT or all R-TWT or all TWT, separately and independently.

To solve these problems, according to certain aspects, embodiments in the present disclosure relate to techniques for suspending and/or resuming a specific B-TWT schedule (or specific R-TWT schedule) without waiting until an SP of the B-TWT schedule by identifying the specific B-TWT schedule (or R-TWT schedule). In some embodiments, an AP or STA can suspend and/or resume all B-TWT or all R-TWT or all TWT, separately and independently.

In one approach, in addition to the TWT information field, a TWT information extension field which includes a B-TWT ID subfield may be added to the TWT information frame format (e.g., added to a TWT information frame action field of the TWT information frame). In some embodiments, when the TWT information extension field is used, the all TWT subfield in the TWT information field may not apply to R-TWT schedules and may apply to all I-TWT and B-TWT. In some embodiments, the TWT information extension field may be optionally present when, for example, a TWT information frame is transmitted by a STA such as an extremely high throughput (EHT) STA. The TWT information extension field may include subfields of B-TWT ID, B-TWT recommendation (BTR), match TWT ID (MTI), and/or match B-TWT recommendation value (MBTRV). The locations of the subfields in the TWT information extension field may be reordered.

In some embodiments, the B-TWT ID subfield may have the size of 5 bits to identify a particular B-TWT schedule (and R-TWT schedule) or may have any size that can identify a particular B-TWT schedule. The BTR subfield may have the size of 3 bit and indicate a type of frame that may be sent during a B-TWT schedule. The MTI subfield may have the size of 1 bit. The MBTRV subfield may have the size of 1 bit.

In some embodiments, if the MTI subfield is set (e.g., set to "1"), then (1) the suspension and/or resumption may apply to a particular B-TWT or R-TWT schedule identified by the B-TWT ID subfield, and (2) the BTR subfield may be reserved. Otherwise (e.g., if the MTI subfield is not set or is set to "0"), the B-TWT ID subfield may be ignored.

In some embodiments, if the MBTRV subfield is set (e.g., set to "1"), then (1) the suspension and/or resumption may apply to all schedules having a broadcast TWT recommendation value (e.g., a type of B-TWT) that is equal to the value set in the BTR subfield, and (2) the B-TWT ID subfield may be reserved. Otherwise (e.g., if the MBTRV subfield is not set or is set to "0"), the BTR subfield may be ignored. In some embodiments, the MTI subfield and the BTR subfield may be mutually exclusive. For example, if the MTI subfield is set to "1", B-TWT ID (which is set in the B-TWT ID field) may be used, while the MTI subfield is set to "0", the suspension and/or resumption may apply to TWT schedules that are matched with types specified in the BTR subfield.

In one approach, a new extended TWT information frame may be defined to include a TWT information extension field such that the new TWT information extension field replaces the TWT information field. In some embodiments, when the new TWT information extension field is used, the all TWT subfield in the TWT information field may not apply to R-TWT schedules and may apply to all I-TWT and B-TWT. In some embodiments, the new extended TWT information fame may be defined by (1) adding a new item "Extended TWT Information" with a corresponding value (e.g., any available value among 12-255) to the unprotected S1G action field values table (e.g., table 470 in FIG. 4B) and (2) setting the unprotected S1G action field of the new extended TWT information frame to the corresponding value.

In some embodiments, the new extended TWT information frame may have a format that is the same as or similar to the TWT information frame, except that the new extended TWT information frame may carry the new TWT information extension field instead of the TWT information field. The new TWT information extension field may include subfields of ID type, TWT ID, B-TWT recommendation (BTR), match TWT ID (MTI), match B-TWT recommendation value (MBTRV), response requested, next TWT request, next TWT subfield size, all TWT, and/or next TWT. The locations of the subfields in the new TWT information extension field may be reordered.

In some embodiments, the ID type subfield may have the size of 1 bit. The TWT ID subfield may have the size of 5 bits to identify a particular B-TWT schedule (and R-TWT schedule) or may have any size that can identify a particular B-TWT schedule. The BTR subfield may have the size of 3 bits and may indicate a type of frame that may be sent during a B-TWT schedule. The MTI subfield may have the size of 1 bit. The MBTRV may have the size of 1 bit. The next TWT subfield size may have the size of 2 bits. The all TWT subfield may have the size of 1 bit. The next TWT subfield may have a variable size and may have the size of 0, 32, 48, or 64 bits, for example.

In some embodiments, the subfields of response requested, next TWT request, next TWT subfield size, all TWT, and next TWT in the new TWT information extension field may functionally operate in the same (or similar) manner as defined in the TWT Information field (e.g., the subfields of response requested 452, next TWT request 453, next TWT subfield size 454, all TWT 455, and/or next TWT 456 in the TWT information field 450 in FIG. 4A).

In some embodiments, the subfields of BTR, MTI and MBTRV in the new TWT information extension field may functionally operate in the same (or similar) manner as defined in the optional TWT information extension field, which is defined in addition to the TWT information field.

In some embodiments, the ID type subfield may indicate whether the TWT ID subfield indicates I-TWT ID or B-TWT ID. For example, if the ID type subfield is set to "0", then bits b1-b2 of the TWT ID subfield may be set to "0" such that bits b3-b5 of the TWT ID subfield can indicate I-TWT ID. If the ID type subfield is set to "0" for instance, then the subfields of BTR, MTI, and MBTRV may not be relevant and may be ignored. If the ID type subfield is set to "1" for example, then bits b1-b5 of the TWT ID subfield may be used to identify a 5 bit B-TWT ID (or R-TWT ID).

In some embodiments, using the new extended TWT information frame, a specific R-TWT schedule can be suspended and/or resumed by (1) setting the ID type subfield to "1", (2) setting the TWT ID to the ID of the specific R-TWT, and (3) setting the MTI subfield to "1". Using the new extended TWT information frame, all R-TWT schedules can be suspended and/or resumed by for instance (2) setting the ID type subfield to "1", (2) setting the MTI subfield to "0", (3) setting the MBTRV subfield to "1", and/or (4) setting the BTR subfield to a value corresponding to R-TWT type (e.g., the value of 4).

In one approach, a new restricted TWT information frame may be defined to include a restricted TWT information field such that the restricted TWT information field replaces the TWT information field. In some embodiments, when the restricted TWT information field is used, the all TWT subfield in the TWT information field may not apply to R-TWT schedules and may apply to all I-TWT and B-TWT. In some embodiments, the restricted TWT information frame may be defined by (1) adding a new item "Restricted TWT Information" with a corresponding value (e.g., any available value among 12-255) to the unprotected S1G action field values table (e.g., table 470 in FIG. 4B) and (2) setting the unprotected S1G action field of the new restricted TWT information frame to the corresponding value.

In some embodiments, the new restricted TWT information frame may have a format that is the same as or similar to the TWT information frame, except that the new restricted TWT information frame may carry the restricted TWT information field instead of the TWT information field. The restricted TWT information field may include subfields of B-TWT ID, next TWT subfield size, all R-TWT, and/or next TWT. The locations of the subfields in the restricted TWT information field may be reordered.

In some embodiments, the B-TWT ID subfield may have the size of 5 bits to identify a particular R-TWT schedule or may have any size that can identify a particular R-TWT schedule. The next TWT subfield size may have the size of 2 bits. The all R-TWT subfield may have the size of 1 bit. The next TWT subfield may have a variable size and may have the size of 0, 32, 48, or 64 bits, for example.

In some embodiments, the B-TWT ID subfield may replace subfields in the TWT information field such as the subfields of TWT flow identifier (3 bit), response requested (1 bit) and next TWT request (1 bit) (or other subfields relating to B-TWT). The all R-TWT subfield may replace the all TWT subfield in the TWT information field. In some implementations, the all R-TWT subfield may indicate, when set to "1" for instance, that the suspension and/or resumption applies to all R-TWT schedules.

In some embodiments, a new broadcast TWT information frame may be defined in a manner similar to that of the new restricted TWT information frame. For example, the new broadcast TWT information frame may include a broadcast TWT information field. The broadcast TWT information field may include subfields of B-TWT ID, next TWT subfield size, all B-TWT, and/or next TWT such that the all B-TWT subfield may indicate, when set to "1", that the suspension and/or resumption applies to all B-TWT schedules.

In one approach, a device may include one or more processors. The one or more processors may generate a first frame including a first target wake time (TWT) identifier subfield (e.g., B-TWT ID subfield). The one or more processors may determine whether a particular broadcast TWT schedule is to be suspended. The one or more processors may set, in response to determining that the particular broadcast TWT schedule is to be suspended, the first TWT identifier subfield to a particular identifier value identifying the particular broadcast TWT schedule, such that a receiver device receiving the first frame with the first TWT identifier subfield is to suspend the particular TWT schedule. The one or more processors may wirelessly transmit, via a transmitter, the generated first frame to the receiver device.

In one approach, the first frame may include a first subfield (e.g., match TWT ID (MTI) subfield). The one or more processors may be configured to set, in response to determining that the particular broadcast TWT schedule is to be suspended, the first subfield to a first value (e.g., MTI is set to "1") such that the receiver device receiving the first frame including the first TWT identifier subfield set with the particular identifier value and the first subfield set with the first value, is to suspend the particular TWT schedule.

In one approach, the first frame may include a second subfield (e.g., BTR subfield). The one or more processors may be configured to set the second subfield to a second value (e.g., a value indicating a type of R-TWT frames) indicating a type of frame that may be sent during a broadcast TWT schedule, such that the receiver device receiving the first frame including the second subfield set with the second value is to suspend a broadcast TWT schedule having a type of frame matching with the second value, for instance. The first frame may include a third subfield (e.g., MBTRV subfield). The one or more processors may be configured to set the third subfield to a third value (e.g., "1") such that the receiver device receiving the first frame including the second subfield set with the second value and the third subfield set with the third value, is to suspend a broadcast TWT schedule having a type of frame matching with the second value, for example.

In one approach, the first frame may include a fourth subfield (e.g., ID type subfield). The one or more processors may be configured to set the fourth subfield to a fourth value (e.g., "0" or "1") indicating a type of TWT identifiers (e.g., I-TWT ID or B-TWT ID). When the fourth value indicates a first type of TWT identifiers (e.g., B-TWT ID), the one or more processors may be configured to set the TWT identifier using all bits of the first TWT identifier subfield for example. When the fourth value indicates a second type of TWT identifiers (e.g., I-TWT ID), the one or more processors may be configured to set the TWT identifier using less than all bits of the first TWT identifier subfield for instance.

In one approach, the first frame may include a frame type field set with a type value indicating a first type of broadcast TWT schedules (e.g., R-TWT schedule). The one or more processors may be configured to set, when the particular broadcast TWT schedule is of the first type of broadcast TWT schedules, the first TWT identifier subfield to the particular identifier value identifying the particular broadcast TWT schedule. The first type of broadcast TWT schedules is a restricted TWT type, for instance. The first frame may include a fifth subfield (e.g., all R-TWT subfield). The one or more processors may be configured to set the fifth subfield to a fifth value such that the receiver device receiving the first frame including the fifth subfield set with the fifth value is to suspend any broadcast TWT schedule that has the first type of broadcast TWT schedules (e.g., R-TWT type).

In one approach, the first frame may include a sixth subfield (e.g., next TWT subfield). The one or more processors are configured to set the sixth subfield to a particular time (e.g., when the next TWT subfield is set to a particular time) such that the receiver device receiving the first frame including the sixth subfield set with the particular time is to resume the particular TWT schedule at the particular time. The one or more processors may be configured to set the sixth subfield to a sixth value (e.g., when the next TWT subfield is set to "0") such that the receiver device receiving the first frame including the sixth subfield set with the sixth value is to resume the particular TWT schedule when the receiver device receives the first frame again at a later time.

Embodiments in the present disclosure have at least the following advantages and benefits.

First, embodiments in the present disclosure can provide useful techniques for suspending and/or resuming a specific B-TWT schedule (or a specific B-TWT schedule) without waiting until an SP of the specific B-TWT schedule, by identifying the specific B-TWT specified in a TWT information field of a TWT information frame. For example, the TWT information field may include a B-TWT ID which not only can identify a B-TWT schedule (or an R-TWT schedule) but also can identify an I-TWT schedule.

Second, embodiments in the present disclosure can provide useful techniques for distinguishing between I-TWT and B-TWT, and between B-TWT and R-TWT. For example, a new restricted TWT information frame may be defined so as to suspend and/or resume a specific R-TWT schedule or all R-TWT schedules. In this manner, all B-TWT schedules or all R-TWT schedules or all TWT schedules can be suspended (or resumed) separately and independently.

FIGS. 1-2 illustrate devices that communicate traffic streams, some of which may be latency sensitive (e.g., those carrying AR/VR information/content). In some embodiments, devices (e.g., STAs, HWD 150, consoles 110, APs, STAs) communicating latency sensitive traffic may be prioritized over other STAs using TWT (e.g., R-TWT). In some embodiments, a device (e.g., AP) may send a TWT information frame (e.g., TWT information frame 400) to suspend or resume TWT schedules (e.g., all B-TWT schedules), and another device (e.g., STA) which receives the TWT information frame may suspend any B-TWT schedule based on information specified in the TWT information frame. Various embodiments of providing a mechanism for a device (e.g., STAs, HWD 150, consoles 110, APs, STAs) to suspend and/or resume a specific TWT schedule (e.g., specific B-TWT or R-TWT schedule) or all schedules (e.g., all B-TWT schedules or all R-TWT schedules) shall be described below with reference to FIGS. 5 to 8.

Figure 5:
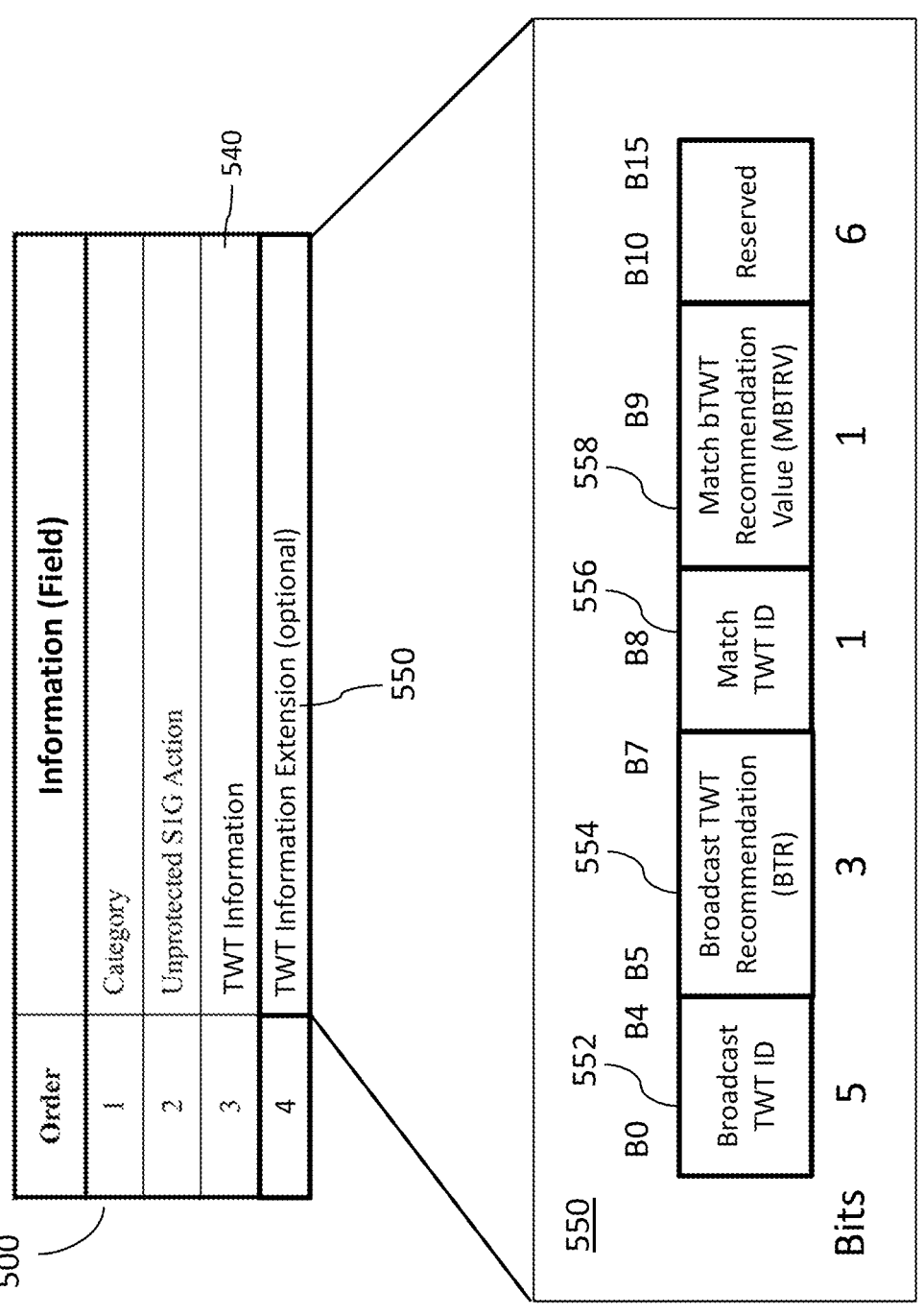
FIG. 5 illustrates an example TWT information frame format, according to a first example implementation of the present disclosure.

FIG. 5 illustrates an example TWT information frame format 500, according to a first example implementation of the present disclosure. In some embodiments, in addition to the TWT information field 540 (which may be the same as or similar to the TWT information field 420 in FIG. 4A), a TWT information extension field 550 which includes a B-TWT ID subfield 552 may be added to the TWT information frame format (e.g., added to a TWT information frame action field of the TWT information frame). In some embodiments, when the TWT information extension field 550 is used, the all TWT subfield in the TWT information field (e.g., TWT information field 450 or 540) may not apply to R-TWT schedules and may apply to all I-TWT and B-TWT. In some embodiments, the TWT information extension field 550 may be optionally present when, for example, a TWT information frame is transmitted by a STA such as an extremely high throughput (EHT) STA. The TWT information extension field may include subfields of B-TWT ID 552, B-TWT recommendation (BTR) 554, match TWT ID (MTI) 556, and/or match B-TWT recommendation value (MB-TRV) 558. The locations of the subfields in the TWT information extension field 550 may be reordered.

In some embodiments, the B-TWT ID subfield 552 may have the size of 5 bits to identify a particular B-TWT schedule (and a particular R-TWT schedule) or may have any size that can identify a particular B-TWT schedule. The BTR subfield 554 may have the size of 3 bits and may indicate a type of frame that may be sent during a B-TWT schedule. The MTI subfield 556 may have the size of 1 bit. The MBTRV subfield 558 may have the size of 1 bit.

In some embodiments, if the MTI subfield 556 is set (e.g., set to "1"), then (1) the suspension and/or resumption may apply to a particular B-TWT or R-TWT schedule identified by the B-TWT ID subfield 552, and (2) the BTR subfield 554 may be reserved. Otherwise (e.g., if the MTI subfield 556 is not set or is set to "0"), the B-TWT ID subfield 552 may be ignored.

In some embodiments, if the MBTRV subfield 558 is set (e.g., set to "1"), then (1) the suspension and/or resumption may apply to all schedules having a broadcast TWT recommendation value (e.g., a type of B-TWT) that is equal to the value set in the BTR subfield (e.g., the broadcast TWT recommendation value of 4 corresponding to R-TWT type), and (2) the B-TWT ID subfield 552 may be reserved. Otherwise (e.g., if the MBTRV subfield 558 is not set or is set to "0"), the BTR subfield 554 may be ignored. In some embodiments, the MTI subfield 556 and the BTR subfield 554 may be mutually exclusive. For example, if the MTI subfield 556 is set to "1", B-TWT ID (which is set in the B-TWT ID field) may be used, while the MTI subfield 556 is set to "0", the suspension and/or resumption may apply to TWT schedules that are matched with types specified in the BTR subfield 554.

Figure 6:
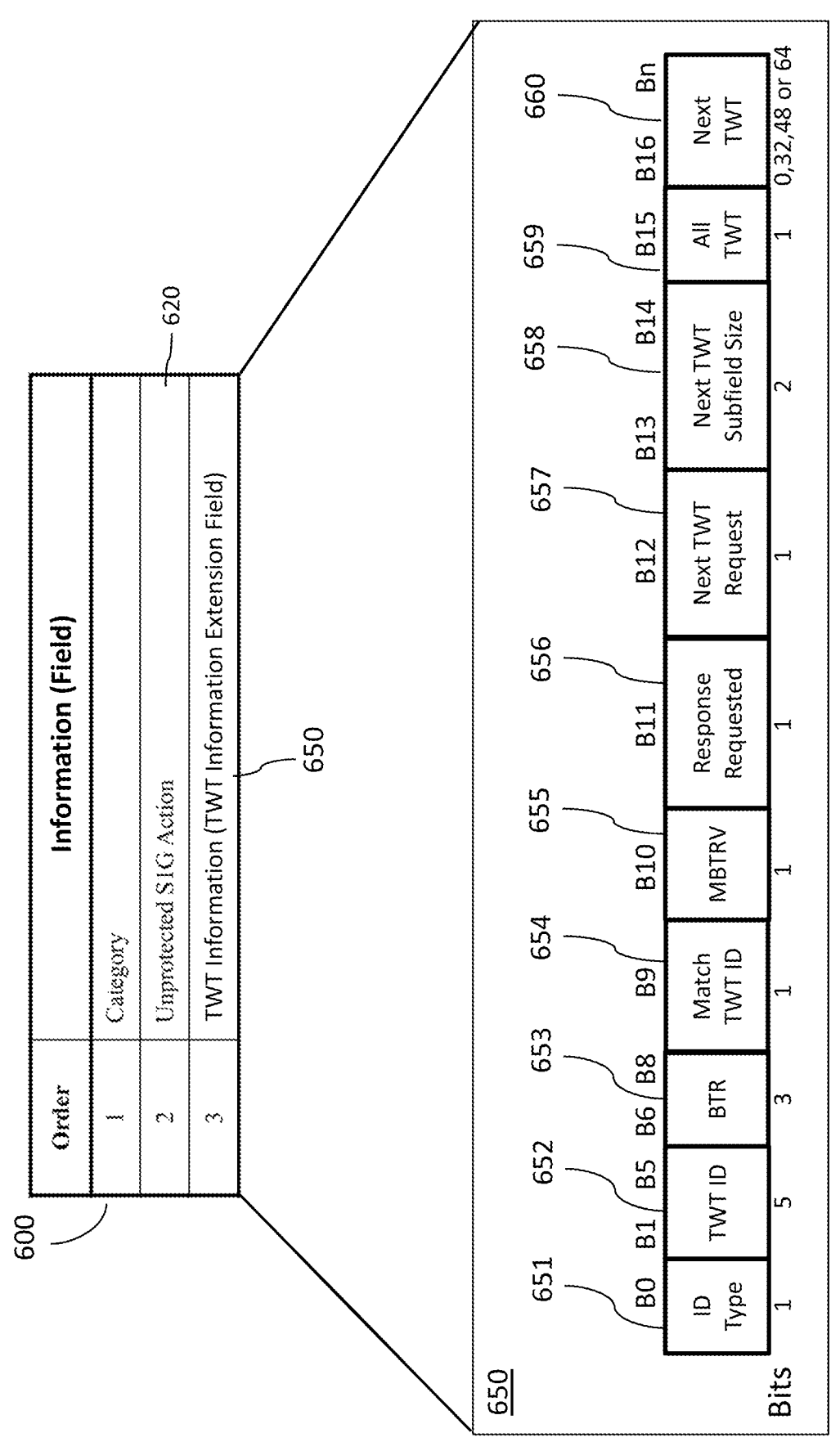
FIG. 6 illustrates an example TWT information frame format, according to a second example implementation of the present disclosure.

FIG. 6 illustrates an example TWT information frame format 600, according to a second example implementation of the present disclosure. In some embodiments, a new extended TWT information frame 600 may be defined to include a TWT information extension field 650 such that the new TWT information extension field 650 replaces the TWT information field (e.g., TWT information field 450 in FIG. 4A). In some embodiments, when the new TWT information extension field 650 is used, the all TWT subfield in the TWT information field (e.g., TWT information field 450 or 540) may not apply to R-TWT schedules and may apply to all I-TWT and B-TWT. In some embodiments, the new extended TWT information frame 600 may be defined by (1) adding a new item "Extended TWT Information" with a corresponding value (e.g., any available value among 12-255) to the unprotected S1G action field values table (e.g., table 470 in FIG. 4B) and (2) setting the unprotected S1G action field 620 of the new extended TWT information frame 600 to the corresponding value.

In some embodiments, the new extended TWT information frame 600 may have a format that is the same as or similar to the TWT information frame, except that the new extended TWT information frame 600 may carry the new TWT information extension field 650 instead of the TWT information field (e.g., TWT information field 450 or 540). The new TWT information extension field 650 may include subfields of ID type 651, TWT ID 652, B-TWT recommendation (BTR) 653, match TWT ID (MTI) 654, match B-TWT recommendation value (MBTRV) 655, response requested 656, next TWT request 657, next TWT subfield size 658, all TWT 659, and/or next TWT 660. The locations of the subfields in the new TWT information extension field 650 may be reordered.

In some embodiments, the ID type subfield 651 may have the size of 1 bit. The TWT ID subfield 652 may have the size of 5 bits to identify a particular B-TWT schedule (and R-TWT schedule) or may have any size that can identify a particular B-TWT schedule. The BTR subfield 652 may have the size of 3 bit and indicate a type of frame that may be sent during a B-TWT schedule. The MTI subfield 654 may have the size of 1 bit. The MBTRV subfield 655 may have the size of 1 bit. The next TWT subfield size 657 may have the size of 2 bits. The all TWT subfield 659 may have the size of 1 bit. The next TWT subfield 660 may have a variable size and may have the size of 0, 32, 48, or 64 bits, for example.

In some embodiments, the subfields of response requested, next TWT request, next TWT subfield size, all TWT, and/or next TWT in the new TWT information extension field 650 may functionally operate in the same (or similar) manner as defined in the TWT Information field (e.g., the subfields of response requested 452, next TWT request 453, next TWT subfield size 454, all TWT 455, and/or next TWT 456 in the TWT information field 450 in FIG. 4A).

In some embodiments, the subfields of BTR 653, MTI 654 and MBTRV 655 in the new TWT information extension field 650 may functionally operate in the same (or similar) manner as defined in the optional TWT information extension field (e.g., TWT information extension field 550, which is defined in addition to the TWT information field (e.g., TWT information field 540).

In some embodiments, the ID type subfield 651 may indicate whether the TWT ID subfield 652 indicates I-TWT ID or B-TWT ID. For example, if the ID type subfield 651 is set to "0", then bits b1-b2 of the TWT ID subfield 652 may be set to "0" such that bits b3-b5 of the TWT ID subfield can indicate I-TWT ID. If the ID type subfield 651 is set to "0", then the subfields of BTR 653, MTI 654, and/or MBTRV 655 may not be relevant and may be ignored. If the ID type subfield 651 is set to "1", then bits b1-b5 of the TWT ID subfield 652 may be used to identify a 5 bit B-TWT ID (or R-TWT ID).

In some embodiments, using the new extended TWT information frame 600, a specific R-TWT schedule can be suspended and/or resumed by (1) setting the ID type subfield 651 to "1", (2) setting the TWT ID 652 to the ID of the specific R-TWT, and (3) setting the MTI subfield 654 to "1". Using the new extended TWT information frame 600, all R-TWT schedules can be suspended and/or resumed by (2) setting the ID type subfield 651 to "1", (2) setting the MTI subfield 654 to "0", (3) setting the MBTRV subfield 655 to "1", and (4) setting the BTR subfield 653 to a value corresponding to R-TWT type (e.g., the value of 4).

Figure 7:
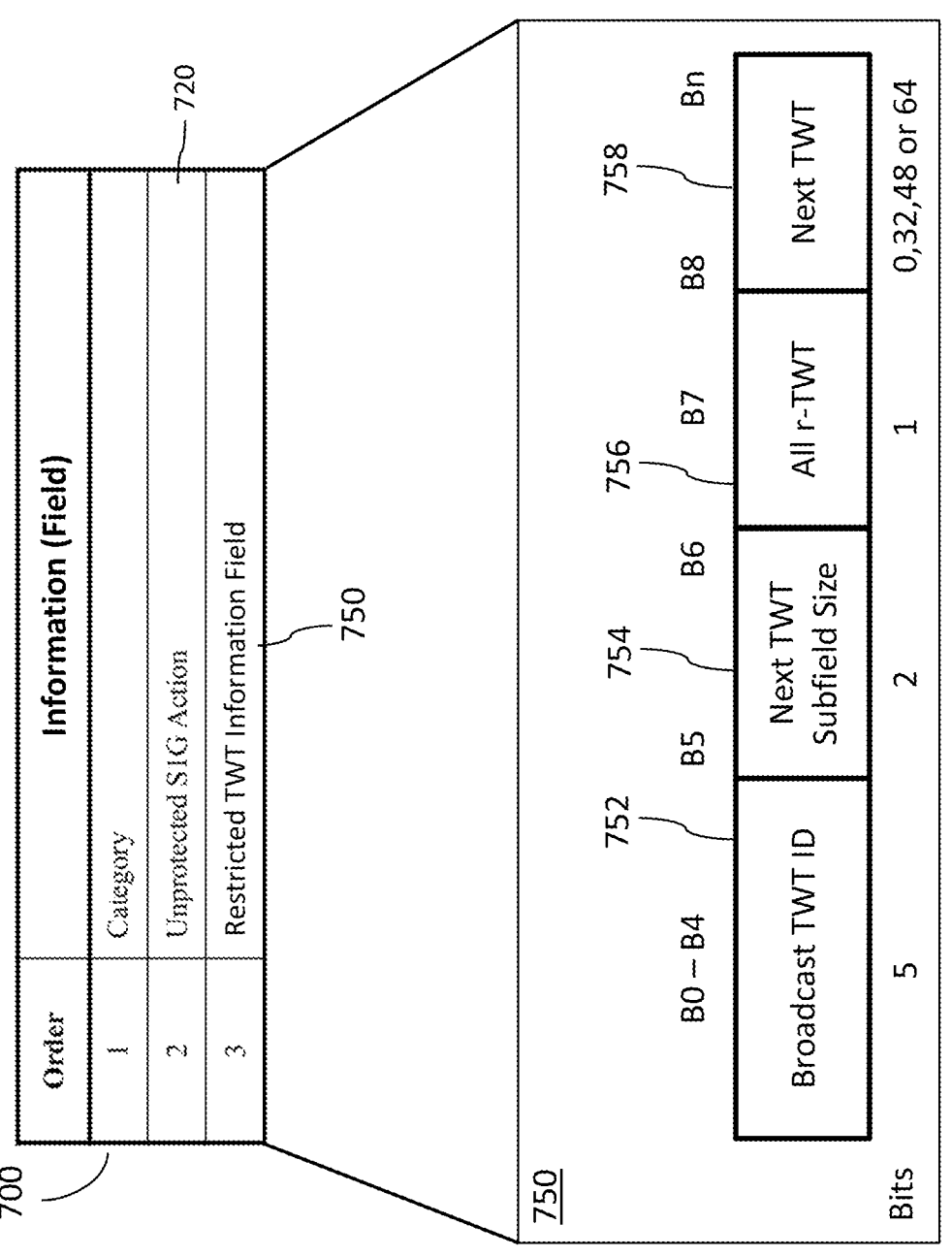
FIG. 7 illustrates an example TWT information frame format, according to a third example implementation of the present disclosure.

FIG. 7 illustrates an example TWT information frame format 700, according to a third example implementation of the present disclosure. In one approach, a new restricted TWT information frame 700 may be defined to include a restricted TWT information field 750 such that the restricted TWT information field 750 replaces the TWT information field (e.g., TWT information field 450 or 540). In some embodiments, when the restricted TWT information field 750 is used, the all TWT subfield in the TWT information field may not apply to R-TWT schedules and may apply to all I-TWT and B-TWT. In some embodiments, the restricted TWT information frame 700 may be defined by (1) adding a new item "Restricted TWT Information" with a corresponding value (e.g., any available value among 12-255) to the unprotected S1G action field values table (e.g., table 470 in FIG. 4B) and (2) setting the unprotected S1G action filed 720 of the new restricted TWT information frame 700 to the corresponding value.

In some embodiments, the new restricted TWT information frame 700 may have a format that is the same as or similar to the TWT information frame (e.g., TWT information frame 400), except that the new restricted TWT information frame 700 may carry the restricted TWT information field 750 instead of the TWT information field (e.g., TWT information field 450). The restricted TWT information field 750 may include subfields of B-TWT ID 752, next TWT subfield size 754, all R-TWT 756, and/or next TWT 758. The locations of the subfields in the restricted TWT information field 750 may be reordered.

In some embodiments, the B-TWT ID subfield 752 may have the size of 5 bits to identify a particular R-TWT schedule or may have any size that can identify a particular R-TWT schedule. The next TWT subfield size 754 may have the size of 2 bits. The all R-TWT subfield 756 may have the size of 1 bit. The next TWT subfield 758 may have a variable size and may have the size of 0, 32, 48, or 64 bits, for example.

In some embodiments, the B-TWT ID subfield 752 may replace subfields in the TWT information field 450 such as the subfields of TWT flow identifier 451 (3 bits), response requested 452 (1 bit) and next TWT request 453 (1 bit) (or other subfields relating to B-TWT). The all R-TWT subfield 756 may replace the all TWT subfield 455 in the TWT information field 450. In some implementations, the all R-TWT subfield 756 may indicate, when set to "1" for instance, that the suspension and/or resumption applies to all R-TWT schedules.

In some embodiments, a new broadcast TWT information frame (not shown) may be defined in a manner similar to that of the new restricted TWT information frame 700. For example, the new broadcast TWT information frame may include a broadcast TWT information field (not shown). The broadcast TWT information field may include subfields of B-TWT ID, next TWT subfield size, all B-TWT, and/or next TWT such that the all B-TWT subfield may indicate, when set to "1" for instance, that the suspension and/or resumption applies to all B-TWT schedules.

FIG. 8 is a flowchart showing a process 800 of suspending and/or resuming TWT schedules (e.g., B-TWT or R-TWT schedules), according to an example implementation of the present disclosure. In some embodiments, the process 800 is performed by a first device (e.g., Console 110, HWD 150, AP or STA). In some embodiments, the process 800 is performed by other entities. In some embodiments, the process 800 includes more, fewer, or different steps than shown in FIG. 8.

In one approach, the first device may generate 802 a first frame (e.g., TWT information frame 500, 600, 700) including a first target wake time (TWT) identifier subfield (e.g., B-TWD ID 552, TWD ID 652, B-TWT ID 752). In one approach, the first device may determine 804 whether a particular broadcast TWT schedule (e.g., particular B-TWT or R-TWT schedule) is to be suspended.

In one approach, in response to determining that the particular broadcast TWT schedule is to be suspended, the first device may set 806 the first TWT identifier subfield to a particular identifier value identifying the particular broadcast TWT schedule (e.g., 5-bit B-TWT ID to identify a particular B-TWT or R-TWT schedule), such that a receiver device (e.g., Console 110, HWD 150, AP or STA) receiving the first frame with the first TWT identifier subfield is to suspend the particular TWT schedule (e.g., particular B-TWT or R-TWT schedule). In one approach, the first device may wirelessly transmit 808 the generated first frame to the receiver device.

In some embodiments, the first frame (e.g., TWT information frame 500, 600) may include a first subfield (e.g., match TWT ID (MTI) subfield 556, 654). In response to determining that the particular broadcast TWT schedule is to be suspended, the first device may set the first subfield to a first value (e.g., MTI is set to "1") such that the receiver device receiving the first frame including the first TWT identifier subfield (e.g., B-TWT ID 552, TWT ID 652) set with the particular identifier value and the first subfield (e.g., MTI 556, 654) set with the first value (e.g., "1"), is to suspend the particular TWT schedule for example.

In some embodiments, the first frame (e.g., TWT information frame 500, 600) includes a second subfield (e.g., BTR subfield 554, 653). The first device may set the second subfield to a second value (e.g., a value indicating a type of R-TWT frames) indicating a type of frame that may be sent during a broadcast TWT schedule, such that the receiver device receiving the first frame including the second subfield (e.g., BTR subfield 554, 653) set with the second value (e.g., the value of 4 indicating a type of R-TWT frames), is to suspend a broadcast TWT schedule having a type of frame matching with the second value (e.g., suspend all R-TWT schedules). The first frame may include a third subfield (e.g., MBTRV subfield 558, 655). The first device may set the third subfield to a third value (e.g., "1") such that the receiver device receiving the first frame including the second subfield (e.g., BTR subfield 554, 653) set with the second value (e.g., the value of 4 indicating a type of R-TWT frames) and the third subfield (e.g., MBTRV subfield 558, 655) set with the third value (e.g., "1"), is to suspend a broadcast TWT schedule having a type of frame matching with the second value (e.g., suspend all R-TWT schedules).

In some embodiments, the first frame (e.g., extended TWT information frame 600) may include a fourth subfield (e.g., ID type subfield 651). The first device may set the fourth subfield (e.g., "0" or "1") to a fourth value indicating a type of TWT identifiers (e.g., I-TWT ID or B-TWT ID). When the fourth value indicates a first type of TWT identifiers (e.g., B-TWT ID), the first device may set the TWT identifier using all bits of the first TWT identifier subfield (e.g., bits 1-5 of TWT ID subfield 652 to indicate B-TWT ID). When the fourth value indicates a second type of TWT identifiers (e.g., I-TWT ID), the first device may set the TWT identifier using less than all bits of the first TWT identifier subfield (e.g., bits 3-5 of TWT ID subfield 652 to indicate the I-TWT ID).

In some embodiments, the first frame (e.g., restricted TWT information frame 700) may include a frame type field (e.g., unprotected S1G action field 720) set with a type value (e.g., a value corresponding to "Restricted TWT Information field" in the unprotected S1G action field values table 470) indicating a first type of broadcast TWT schedules (e.g., R-TWT schedule). When the particular broadcast TWT schedule is of the first type of broadcast TWT schedules, the first device may set the first TWT identifier subfield (e.g., B-TWT ID 752) to the particular identifier value identifying the particular broadcast TWT schedule. The first type of broadcast TWT schedules may be a restricted TWT type. The first frame may include a fifth subfield (e.g., all R-TWT subfield 756). The first device may set the fifth subfield (e.g., all R-TWT subfield 756) to a fifth value (e.g., "1") such that the receiver device receiving the first frame including the fifth subfield (e.g., all R-TWT subfield 756) set with the fifth value (e.g., "1") is to suspend any broadcast TWT schedule that has the first type of broadcast TWT schedules (e.g., suspend all R-TWT schedules).

In some embodiments, the first frame e.g., TWT information frame 500, 600, 700) may include a sixth subfield (e.g., next TWT subfield 660, 758). The first device may set the sixth subfield (e.g., next TWT subfield 660, 758) to a particular time such that the receiver device receiving the first frame including the sixth subfield set with the particular time is to resume the particular TWT schedule at the particular time (e.g., suspending the particular TWT schedule until the particular time). The first device may set the sixth subfield (e.g., next TWT subfield 660, 758) to a sixth value (e.g., "0") such that the receiver device receiving the first frame including the sixth subfield set with the sixth value is to resume the particular TWT schedule when the receiver device receives the first frame again at a later time (e.g., suspending the particular TWT schedule indefinitely).

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A device comprising:
one or more processors configured to:
    generate a first frame including a first target wake time (TWT) identifier subfield and a second subfield;
    determine whether a particular broadcast TWT schedule is to be suspended;
    in response to determining that the particular broadcast TWT schedule is to be suspended, set the first TWT identifier subfield to a particular identifier value identifying the particular broadcast TWT schedule, such that a receiver device receiving the first frame with the first TWT identifier subfield is to suspend the particular TWT schedule;
    set the second subfield to a second value indicating a type of frame that may be sent during a broadcast TWT schedule, such that the receiver device receiving the first frame including the second subfield set with the second value is to suspend a broadcast TWT schedule during which the type of frame indicated by the second value is sent; and
    wirelessly transmit, via a transmitter, the generated first frame to the receiver device.

2. The device according to claim 1, wherein
the first frame includes a first subfield, and
the one or more processors are configured to, in response to determining that the particular broadcast TWT schedule is to be suspended, set the first subfield to a first value such that the receiver device receiving the first frame including the first TWT identifier subfield set with the particular identifier value and the first subfield set with the first value, is to suspend the particular TWT schedule.

3. The device according to claim 1, wherein
the first frame includes a third subfield, and
the one or more processors are configured to set the third subfield to a third value such that the receiver device receiving the first frame including the second subfield set with the second value and the third subfield set with the third value, is to suspend a broadcast TWT schedule having a type of frame matching with the second value.

4. The device according to claim 1, wherein
the first frame includes a fourth subfield, and
the one or more processors are configured to
    set the fourth subfield to a fourth value indicating a type of TWT identifiers,
    when the fourth value indicates a first type of TWT identifiers, set the TWT identifier using all bits of the first TWT identifier subfield, and
    when the fourth value indicates a second type of TWT identifiers, set the TWT identifier using less than all bits of the first TWT identifier subfield.

5. The device according to claim 1, wherein
the first frame includes a frame type field set with a type value indicating a first type of broadcast TWT schedules, and
the one or more processors are configured to:
    when the particular broadcast TWT schedule is of the first type of broadcast TWT schedules, set the first TWT identifier subfield to the particular identifier value identifying the particular broadcast TWT schedule.

6. The device according to claim 5, wherein the first type of broadcast TWT schedules is a restricted TWT type.

7. The device according to claim 5, wherein
the first frame includes a fifth subfield, and
the one or more processors are configured to set the fifth subfield to a fifth value such that the receiver device receiving the first frame including the fifth subfield set with the fifth value is to suspend any broadcast TWT schedule that has the first type of broadcast TWT schedules.

8. The device according to claim 1, wherein
the first frame includes a sixth subfield, and
the one or more processors are configured to set the sixth subfield to a particular time such that the receiver device receiving the first frame including the sixth subfield set with the particular time is to resume the particular TWT schedule at the particular time.

9. The device according to claim 8, wherein
the one or more processors are configured to set the sixth subfield to a sixth value such that the receiver device receiving the first frame including the sixth subfield set with the sixth value is to resume the particular TWT schedule when the receiver device receives the first frame again at a later time.

10. A method comprising:
generating, by a first device, a first frame including a first target wake time (TWT) identifier subfield and a second subfield;
determining, by the first device, whether a particular broadcast TWT schedule is to be suspended;
in response to determining that the particular broadcast TWT schedule is to be suspended, setting, by the first device, the first TWT identifier subfield to a particular identifier value identifying the particular broadcast TWT schedule, such that a receiver device receiving the first frame with the first TWT identifier subfield is to suspend the particular TWT schedule;
setting the second subfield to a second value indicating a type of frame that may be sent during a broadcast TWT schedule, such that the receiver device receiving the first frame including the second subfield set with the second value is to suspend a broadcast TWT schedule during which the type of frame indicated by the second value is sent; and
wirelessly transmitting, by the first device, the generated first frame to the receiver device.

11. The method according to claim 10, wherein the first frame includes a first subfield, and the method comprises:

in response to determining that the particular broadcast TWT schedule is to be suspended, setting, by the first device, the first subfield to a first value such that the receiver device receiving the first frame including the first TWT identifier subfield set with the particular identifier value and the first subfield set with the first value, is to suspend the particular TWT schedule.

12. The method according to claim 10, wherein the first frame includes a third subfield, and the method comprises:

setting, by the first device, the third subfield to a third value such that the receiver device receiving the first frame including the second subfield set with the second value and the third subfield set with the third value, is to suspend a broadcast TWT schedule having a type of frame matching with the second value.

13. The method according to claim 10, wherein the first frame includes a fourth subfield, and the method comprises:

setting, by the first device, the fourth subfield to a fourth value indicating a type of TWT identifiers, when the fourth value indicates a first type of TWT identifiers, setting, by the first device, the TWT identifier using all bits of the first TWT identifier subfield, and when the fourth value indicates a second type of TWT identifiers, setting, by the first device, the TWT identifier using less than all bits of the first TWT identifier subfield.

14. The method according to claim 10, wherein the first frame includes a frame type field set with a type value indicating a first type of broadcast TWT schedules, and the method comprises:

when the particular broadcast TWT schedule is of the first type of broadcast TWT schedules, setting, by the first device, the first TWT identifier subfield to the particular identifier value identifying the particular broadcast TWT schedule.

15. The method according to claim 14, wherein the first type of broadcast TWT schedules is a restricted TWT type.

16. The method according to claim 14, wherein the first frame includes a fifth subfield, and the method comprises:

setting, by the first device, the fifth subfield to a fifth value such that the receiver device receiving the first frame including the fifth subfield set with the fifth value is to suspend any broadcast TWT schedule that has the first type of broadcast TWT schedules.

17. The method according to claim 10, wherein the first frame includes a sixth subfield, and the method comprises:

setting the sixth subfield to a particular time such that the receiver device receiving the first frame including the sixth subfield set with the particular time is to resume the particular TWT schedule at the particular time.

18. The method according to claim 17, further comprising:

setting the sixth subfield to a sixth value such that the receiver device receiving the first frame including the sixth subfield set with the sixth value is to resume the particular TWT schedule when the receiver device receives the first frame again at a later time.

* * * * *